United States Patent [19]
Ritze

[11] 3,754,816

[45] Aug. 28, 1973

[54] STEEP-EDGE ABSORPTION FILTER

[75] Inventor: Willi Ritze, Mainz, Mombach, Germany

[73] Assignee: Jenaer Glaswerk Schott & Gen., Mainz, Germany

[22] Filed: Nov. 15, 1967

[21] Appl. No.: 683,228

[30] Foreign Application Priority Data
Nov. 25, 1966 Germany.............................. J 32335

[52] U.S. Cl........................ 350/311, 65/33, 65/111, 106/54
[51] Int. Cl. ......................... G02b 5/22, C03c 3/22
[58] Field of Search..................... 350/311; 106/52, 106/54; 65/33, 111, 117

[56] References Cited
UNITED STATES PATENTS
1,864,858  6/1932  Rising .............................. 65/33 UX

OTHER PUBLICATIONS

Weyl, W. A., Coloured Glasses, The Society of Glass Technology, Sheffield, Mon., 1951.

*Primary Examiner*—Robert L. Lindsay, Jr.
*Attorney*—Burgess, Dinklage and Sprung

[57] ABSTRACT

There is disclosed glass compositions, i.e., filters characterized by steep edged absorption curves in the wave length range $\lambda = 380 - 475$ nm. The filters are prepared by heat treating glass samples having the following composition at a temperature between 550° and 620° C at which CdS + ZnS color centers are formed:

| | wt-% |
|---|---|
| $SiO_2$ | 44–66 |
| $K_2O$ | 8–24 |
| $ZnO$ | 12–24 |
| $B_2O_3$ | 0– 8 |
| $Na_2O$ | 0– 4 |
| $Al_2O_3$ | 0– 3 |
| $MgO$ | 0– 6 |
| $CaO$ | 0–12 |
| $BaO$ | 0– 8 |
| $SrO$ | 0–12 |
| $ZnS$ | 0.5–2.4 |
| $CdS$ | 0.5–1.5 |

1 Claim, 1 Drawing Figure

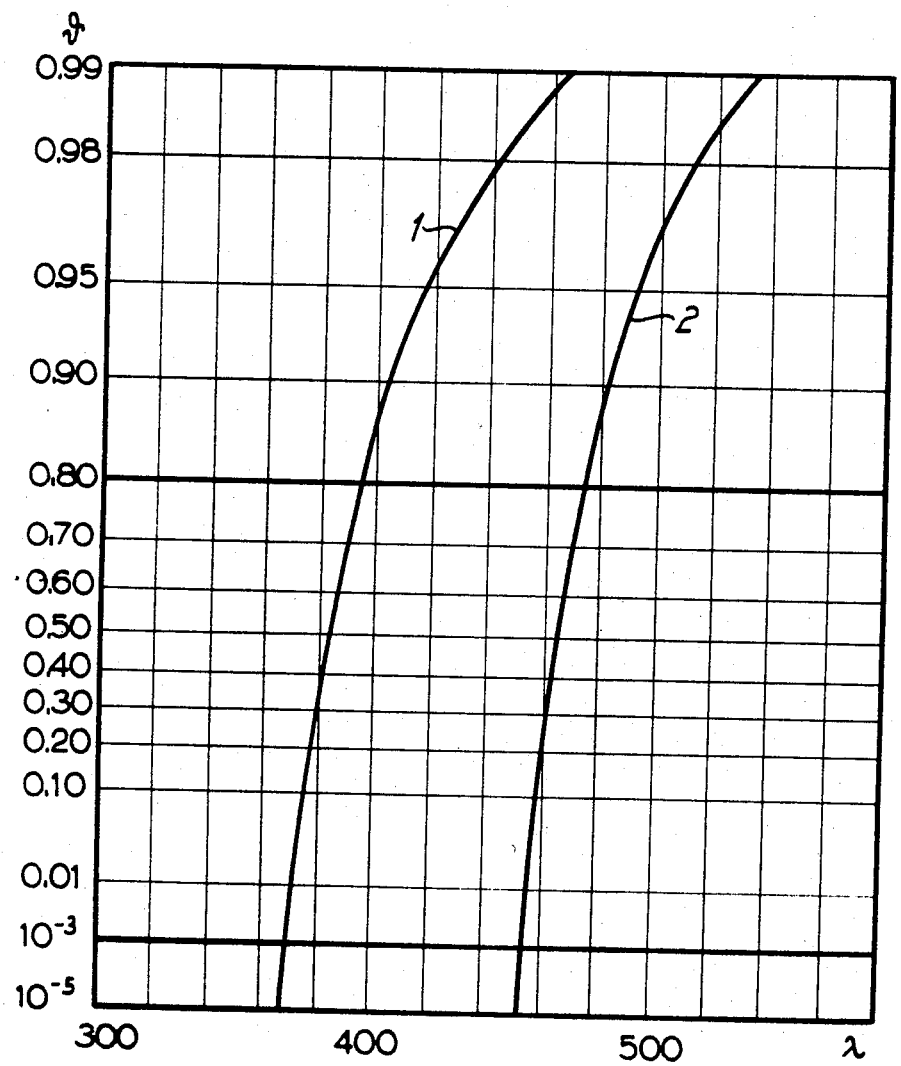

STEEP-EDGE ABSORPTION FILTER

This invention relates to a filter having a steep edge absorption pattern in the wave length range of $\lambda = 380 - 475$ nm and having a net transmittance of 0.80.

Yellow glasses are known which have diminishing absorption bands at the short-wave length end of the visible spectrum, $\lambda = 425$ to 475 nm, net transmittance 0.80. These glasses are obtained through colloidal coloration by CdS + S of $SiO_2$-CaO-BaO-alkali oxide glasses following heat treatment. The aforesaid known colored glasses have the following disadvantages:

1. The absorption width of their steep edge curves $\Delta \lambda$ at $\Theta = 10^{-3}$ to 0.80 and 3 mm thickness is greater than 60 nm, and at 1 mm thickness it is greater than 100 nm.
2. In filters having a thickness of 1 mm the absorption background is greatly brightened. It becomes necessary to use filters having a thickness equal to or greater than 3 mm in order to diminish the absorption background to $\Theta = 10^{-3}$ in the wave length range $\lambda$ of 400 – 430 nm.
3. The position or location of the absorption bands can be shifted only from $\lambda 490 - 425$ nm ($\Theta = 0.80$).
4. The manufacture of these colored glasses is subject to very exacting requirements and from batch to batch variations have to be expected as concerns the degree of steepness and location of the wave length.

The object of the present invention is to provide filters characterized by steep edged absorption curves in the wave length range $\lambda = 380 - 475$ nm which avoid the disadvantages as set out above.

Another object of the invention is to provide a method of manufacturing filters characterized by steep edged absorption curves in the wave length range $\lambda = 380 - 475$ nm which is capable of greater and consistent accuracy from one batch to the next.

As will be described in more detail hereinafter, these objects are achieved according to the invention by heat treating a glass of the following composition in the transformation range between 550° and 620° C to thereby form CdS + ZnS color centers therein:

| | Weight Percent |
|---|---|
| $SiO_2$ | 44–66 |
| $K_2O$ | 8–24 |
| ZnO | 12–25 |
| $B_2O_3$ | 0–8 |
| $Na_2O$ | 0–4 |
| $Al_2O_3$ | 0–3 |
| MgO | 0–6 |
| CaO | 0–12 |
| BaO | 0–8 |
| SrO | 0–12 |
| ZnS | 0.5–2.4 |
| CdS | 0.5–1.5 |

According to a preferred embodiment of the invention a basic glass having the following composition is heat treated at $580° \pm 3°$ C:

| | Weight Percent |
|---|---|
| $SiO_2$ | 51.4 |
| $B_2O_3$ | 3.9 |
| $K_2O$ | 22.2 |
| ZnO | 19.9 |
| ZnS | 1.6 |
| CdS | 1.0 |

It has furthermore been found advantageous for the total amount of the alkaline earth oxides plus zinc oxide present not to exceed 26 percent by weight.

The heat treatment of these glasses in this very narrow temperature range in the transformation region (i.e., between 570° and 620° C) results in the production of mixed color centers by the ZnS + CdS, which determine the location ($\lambda = 380 - 475$ nm) and the steepness of the edge of the absorption curve. If the temperature is exceeded, the ZnS precipitates out too soon and the glass becomes cloudy. If the narrow ranges of 0.5 to 2.4 percent ZnS by weight and 0.5 to 1.5 percent CdS by weight are exceeded, only the CdS precipitates and this results in that the steepness of the edge of the absorption curve and of the location thereof, which then cannot be shifted to a shorter wave length, that is, it cannot be shifted below $\lambda$ 424 nm ($\Theta - 0.80$) towards the ultraviolet region. Further the curve edge of the filter is less steep and the filter has a highly brightened absorption background.

ZnS alone is not precipitated by the heat treatment in the basic glass described. A colorless glass is obtained. In a basic glass having a $B_2O_3$ content greater than 8 percent by weight, the precipitation of ZnS easily results in cloudy glass. The same reaction occurs if the alkali content is greater than 24 percent by weight.

The drawing herein shows the net transmittance $\Theta$ in relation to the wave length $\lambda$ for a glass plate having a thickness of 1 mm.

The filters having steep edge absorption curves according to the invention have the following advantages over the colored glasses of the prior art:

1. The absorption width of the steep edge $\Delta \lambda$ of net transmittance $\Theta = 10^{-3}$ to 0.80 amounts to less than 25 nm at a thickness of 1 mm (curves 1 and 2 of the drawing).
2. The absorption edge is steep down to $\Theta = 10^{-5}$ at a thickness of 1 mm (curves 1 and 2).
3. The location of the steep edge can be placed anywhere from $\lambda = 475$ nm to $\lambda = 380$ nm by heat treatment in the transformation region ($\Theta = 0.80$, 1 mm thickness) (Curve 2).
4. The absorption curve edge, even at a thickness of 0.3 mm, is still steep down to $\Theta = 10^{-5}$.
5. The absorption width of the steep edge $\Delta \lambda$ of transmittance of $\Theta = 10^{-3}$ to 0.80 is less than 60 nm at a thickness of 0.15 mm.
6. The manufacture of these steep edge filter glasses is reproducible even on a large technical scale. The location of the absorption curve's steep edge at $\Theta = 0.80$ can be accurately adjusted within $\pm 2$ nm.

A typical filter having a composition having the advantages of the present invention together with the method of preparing the same is as follows:

EXAMPLE

The following batch was mixed in the conventional glass mixing machine and was thereafter placed in a ceramic crucible furnace for about 16 hours at 1,290° C.

| COMPOSITION | | FORMULA FOR A BATCH OF 1000 kg | |
|---|---|---|---|
| Oxide | % by weight | Raw materials | kilograms |
| $SiO_2$ | 51.7 | $SiO_2$ | 518.03 |
| $B_2O_3$ | 3.9 | $H_3BO_3$ | 69.03 |
| $K_2O$ | 22.5 | $K_2CO_3$ | 330.64 |
| ZnO | 19.5 | ZnO | 198.18 |
| $NH_4Cl$ | 0.1 | $NH_4Cl$ | 1.00 |
| ZnS | 1.65 | ZnS | 16.50 |
| CdS | 1.0 | CdS | 10.02 |

Thereafter the batch was clarified at 1,310° to 1320° C for an additional 12 to 14 hours. It was then allowed to cool down to 1,180° C and stirred for about 3 to 4 hours down to 1,050° C. After an additional period of standing to permit cooling, the molten mixtures were poured off at about 1,030° C into a preheated iron mold, and then cooled in a lehr at 2° C/hr down to room temperature.

After this cooling was completed the ingot was divided into pieces and the pieces then subjected to a special heat treatment until the desired filter absorption pattern was achieved. The heat treatment involved heating the glass to a temperature in the range of between 550° and 620° C (transformation range) and at which CdS + ZnS color centers are formed.

I claim:

1. A filter having a steep edge absorption curve in the wavelength range $\lambda = 380$–$475$ nm which is a glass formed by heat treatment in the transformation range at $580 \pm 3°$ C for the formation of CdS + ZnS color centers, of a glass having the following composition:

| | |
|---|---|
| $SiO_2$ | 51.4 wt-% |
| $B_2O_3$ | 3.9 wt-% |
| $K_2O$ | 22.2 wt-% |
| ZnO | 19.9 wt-% |
| ZnS | 1.6 wt-% |
| CdS | 1.0 wt-% |

* * * * *